No. 874,484. PATENTED DEC. 24, 1907.
E. L. BRILLHART.
VEHICLE AND SPRING THEREOF.
APPLICATION FILED SEPT. 27, 1906.
2 SHEETS—SHEET 1.
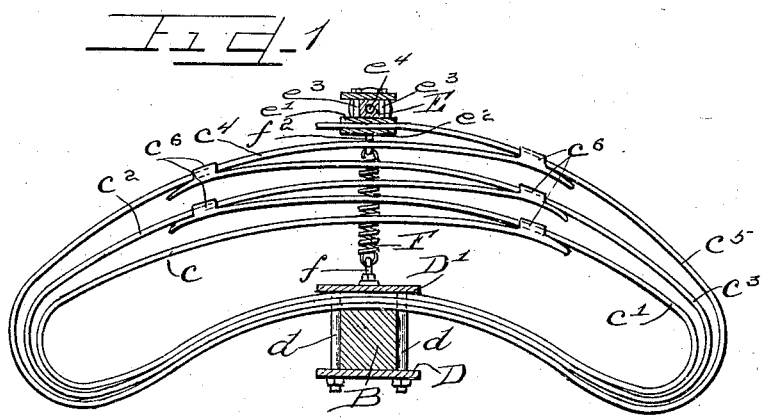
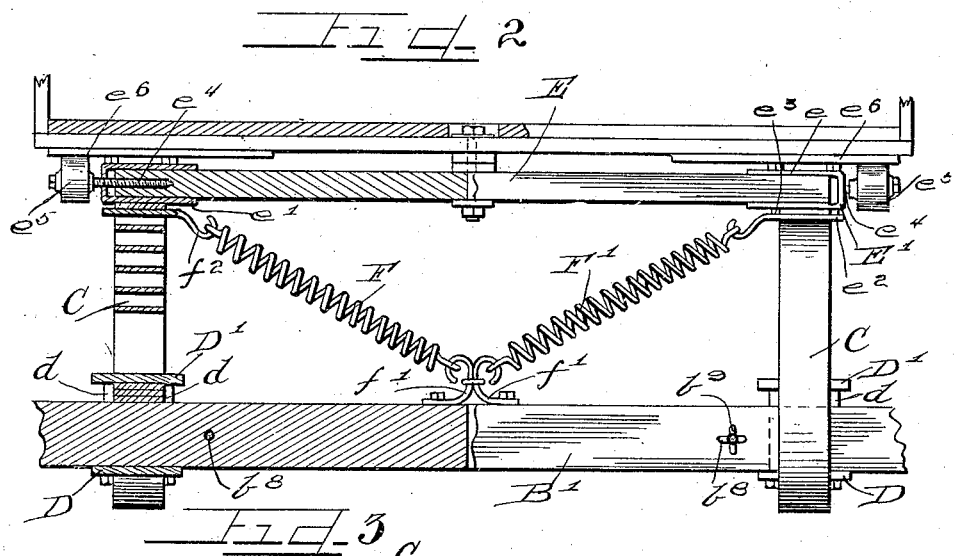
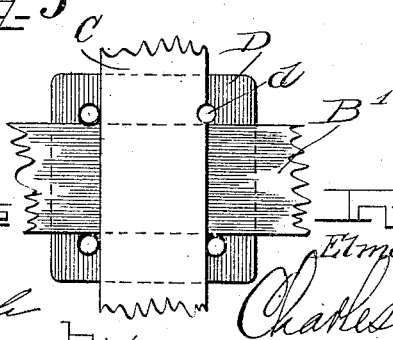

No. 874,484.
PATENTED DEC. 24, 1907.
E. L. BRILLHART.
VEHICLE AND SPRING THEREOF.
APPLICATION FILED SEPT. 27, 1906.
2 SHEETS—SHEET 2.
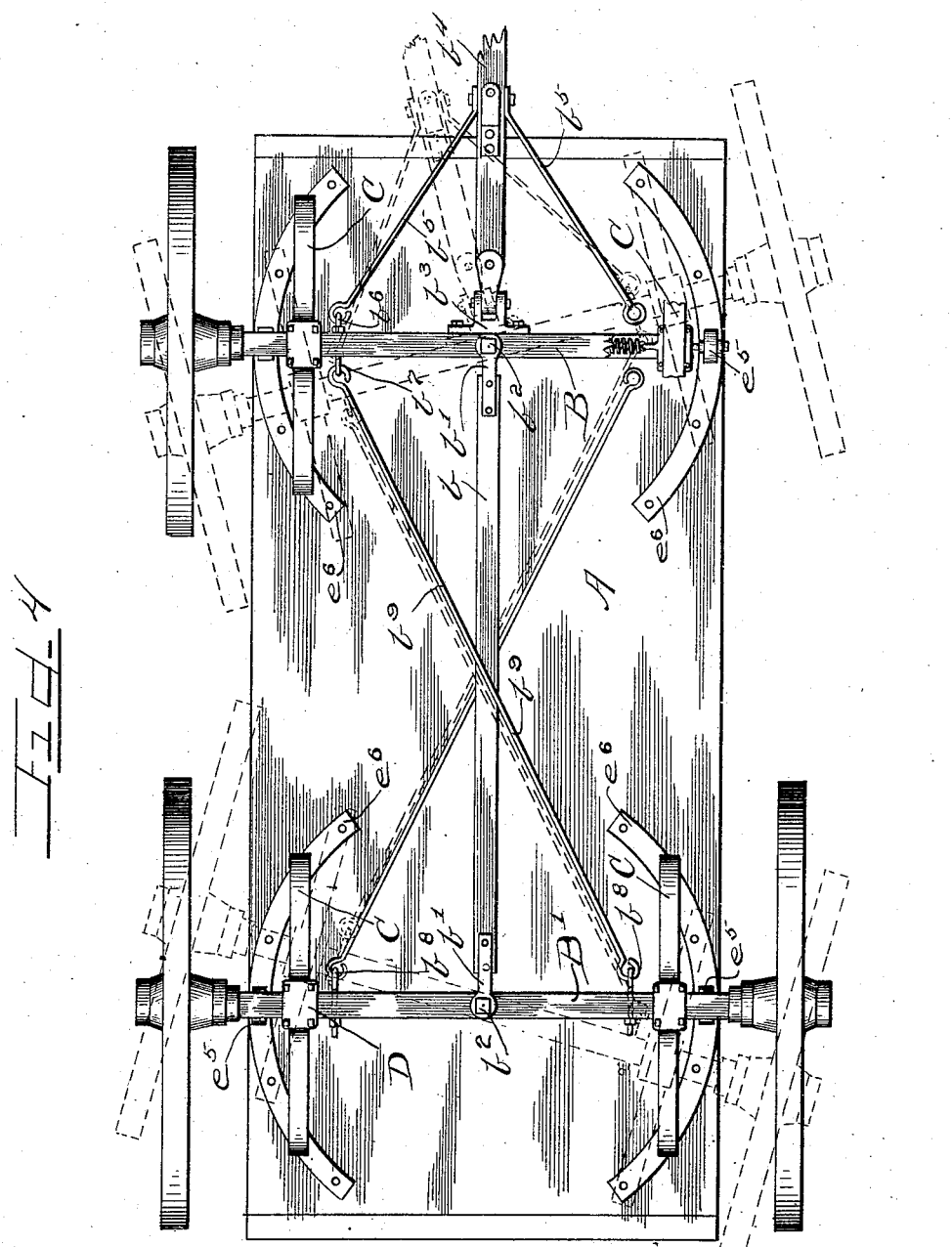

UNITED STATES PATENT OFFICE.

ELMER LEWIS BRILLHART, OF PENTWATER, MICHIGAN.

VEHICLE AND SPRING THEREOF.

No. 874,484.  Specification of Letters Patent.  Patented Dec. 24, 1907.

Application filed September 27, 1906. Serial No. 336,429.

*To all whom it may concern:*

Be it known that I, ELMER LEWIS BRILL-HART, a citizen of the United States, and a resident of Pentwater, Oceana county, Michigan, and whose post-office address is Pentwater, Oceana county, Michigan, have invented certain new and useful Improvements in Vehicles and Springs Thereof; and I do hereby declare that the following is a full, clear, and exact description of the same, reference being had to the accompanying drawings, and to the letters of reference marked thereon, which form a part of this specification.
This invention relates more particularly to vehicles and springs therefor and is shown embodied in a vehicle adapted for use in transporting fruit, eggs, or other perishable matter likely to be injured by concussion or jarring when in transit.

In the springs heretofore devised for fruit wagons and other purposes, the springs have usually been constructed to operate as a whole, as a consequence when used with a fruit wagon carrying but a small load the springs are too stiff, inevitably injuring the fruit while in a heavy load, the springs adjusted to carry an average load are not sufficiently strong to bear the weight and as a consequence contact with the bumpers usually carried on the axle and injure the fruit by the shock.

The object of this invention is to provide a spring so constructed as to adapt itself to varying loads to afford equal resiliency, a portion of the spring only operating with light loads and succeeding portions of the spring being brought into operation as the load is increased until maximum load is secured.

The invention consists in the matters hereinafter described and more fully pointed out and defined in the appended claims.

In the drawings: Figure 1 is a side elevation of a spring embodied in my invention and shows the axle and hounds of the vehicle in transverse section. Fig. 2 is a fragmentary rear elevation partly in transverse section of a device embodying my invention.
Fig. 3 is an enlarged detail partly in plan view and partly in horizontal section illustrating the means for securing the springs upon the axle. Fig. 4 is a bottom plan view of a vehicle embodying my invention.
As shown in said drawings: The invention is embodied in a fruit wagon provided with a box A, supported upon a front and a rear axle B and B' by means of the springs C hereinafter described. As shown, said front and rear axles are connected centrally by means of a longitudinal reach $b$ provided with a coupling $b'$ at each end adapted to receive the king bolt $b^2$, which passes therethrough and through said axle. A pivot bearing $b^3$ is rigidly bolted to the front side of the axle B, and affords pivotal connection with the draft tongue $b^4$, which is braced laterally to said axle by means of the brace rods $b^5$, which at their rear ends are secured to the axle by means of eye bolts $b^6$. Corresponding eye bolts $b^7$ and $b^8$ respectively are engaged in and project from the rear side of the front axle and the front side of the rear axle respectively at corresponding distances from the center and connected in said eye bolts are rods $b^9$ which extend from the eye bolts on the front axle to the eye bolt on the rear axle on the opposite side of the reach therefrom, as shown in Fig. 4 and act to move the corresponding ends of the axles oppositely, when the front wheels are cramped, as shown in dotted lines in Fig. 4.

Rigidly secured upon each end of each axle adjacent the side of the box, are the springs C, which in the construction shown, each comprises a plurality of double ended leaf springs, which are secured at their middle upon the axle by means of a clip comprising upper and lower plates of metal D and D', which engage below the axle and above the central portion of the leaves of said spring. Bolts $d$ extend through said plates on each side of the axle and rigidly bind or clamp the same upon the axle. Said bolts bear closely against the sides of the spring and the axle and one of which is seated half way in the edge of said leaves as shown in Fig. 3, thereby holding the same from relative movement. The upper or free ends of said springs comprise the ends $c$ and $c'$ of the upper leaf which taper to the extremity and are provided, adjacent the extremity, with the laterally disposed flanges $c^6$. Said ends overlap each other for a considerable distance as shown and the flanges $c^6$ on the end $c$ engage on each side of the end $c'$ supporting the free extremity thereof at a considerable height while the free extremity of said end $c'$ of the upper leaf extends beneath the end $c^2$ of the second or intermediate leaf supporting the same, in a similar manner in an elevated position and in a like manner, the opposite ends of said leaves extend past the center and support alternate ends of leaves. In each instance the side flanges $c^6$ engaging on each side of the supported leaf or end, and holding the same from slipping laterally.

The outermost or upper leaf or end $c^5$ is not tapered as are the others at the extremities, but is of approximately uniform thickness and secured thereon is one end of the transverse beam or hound E, which consists of a bar of wood or metal of requisite length rigidly secured on said spring end $c^5$ by means of a clip, similar to that which secures the spring to the axle and comprises, as shown, a plate or strap of metal E', bent to engage above and below the bar E, the ends of which are indicated by $e$, and $e'$ and a plate $e^2$, which engages beneath the spring and all said plates are rigidly secured together by transverse bolts $e^3$, which extend through the same in close proximity with the sides of the spring and the bar or hound, and act to hold the same in unvarying relation. The strap of metal E' affords a bearing for the journal or axle $e^4$ secured in each end of each hound. Said journal, as shown, is provided at its inner end with a wood screw having threaded engagement in said strap and the end of the hound, and provided on its outer end with a roller $e^5$ adapted to track on a segment $e^6$ secured on the under side of the wagon box A in position for the same to travel thereon as the axles are turned as shown in Fig. 4. The wagon box A is secured on said hounds by means of king bolts passing through bottom of the box and both the front and rear hounds respectively, and which permit the hound turning beneath the wagon box to correspond with the movement of the axles in cramping the wheels. Said segments act as a fifth wheel at each end of the box and means are provided for controlling any side swing or oscillation of the box with respect to the axle comprising strong pulling springs herein, shown as spiral springs and indicated by F and F'. Said springs F and F' at their ends are engaged upon suitable clips $f$ and $f'$, which are rigidly bolted to the respective axles and which at their outer upper ends are engaged with an eye or hook $f^2$ carried on the plate $e^2$ engaged beneath the upper leaf end $c^5$ of the spring C.

The operation is as follows: The springs afford a yielding support for the wagon box, the wagon when empty being supported mainly upon the extremity or leaves $c^5$ a part of the weight thereof being borne upon the tapering ends of the leaves $c^4$, which are of course depressed thereby and to an extent the weight is communicated more or less in a decreasing degree to the remaining leaves. When weight is added to the load the ends of the leaves are depressed coming into more positive bearing and also lengthening the contact of adjacent leaves of the spring ends with each other, thereby constantly increasing the stiffness of the spring to sustain the increasing load. When the maximum load has been secured, the spring is not compressed sufficiently to bring the ends of the leaves all in contact directly beneath the beam or hound. Inequalities in the road, however, cause vertical oscillation of the box and tend to bring said leaves into longer bearing contact, obtaining the maximum efficiency of the same until when fully compressed, said springs act in a sense similarly with an elliptical spring, only with greater or augmented power. It will thus be seen that the resiliency of the spring varies with the load, allowing perfect ease of movement even when the wagon is empty, and affording a perfectly resilient support, when fully loaded. Inasmuch, also, as the springs F and F' are applied under considerable tension, depression of the hound by the load is compensated by the contraction of said spring, so that the same acts at all times to exert an inwardly directed force on the ends of the beam absorbing any tendency toward under-lateral oscillation. Owing to the construction described both axles of the vehicle may be cramped in turning, thus reducing the amount of space required in turning as compared with an ordinary farm wagon, approximately one-half. The segment $e^6$ acts as a fifth wheel upon which the rollers $e^5$ journaled at the ends of the beams E track in turning.

While I have described the spring as adaptable for use in fruit wagons and other vehicles, it is obvious that the same is not only adaptable to support the vehicle box, but may conveniently be used in connection with the vehicle seat or for any desired purpose, and it is, also, evident that it is not essential that said spring be arranged transversely of the axle, inasmuch as the same can be arranged, if preferred, longitudinally of the axle, nor is it essential that the spring ends or leaves should be integrally connected above the axle as, obviously, separate and independent leaves may be employed, if preferred, and may be secured at different distances apart, nor is it essential that the two sides of the spring as shown should be symmetrical, as, obviously, the leaves on one side of the spring may be longer or shorter than those on the other, as preferred, and, obviously, many details of construction may be varied without departing from the principles of this invention.

I claim as my invention:

1. A spring comprising oppositely disposed leaves each fulcrumed on the top of the other at the free extremity thereof.

2. A spring comprising oppositely disposed leaves each movably supported upon and above the outer extremity of the next lower and means preventing lateral slip of one leaf with respect to another.

3. A spring comprising oppositely and inwardly directed leaves each projecting past the center and affording a fulcrum for a similar higher leaf, and tapered flanged ends on said leaves acting to engage a superposed leaf.

4. A spring comprising a plurality of oppositely directed tapered leaves, each engaged at the end with the next above and affording a fulcrum therefor.

5. A spring comprising a plurality of right and left inwardly directed leaves, each extending beyond the center, and affording a fulcrum for the next higher leaf, and a flange near the end of each leaf, acting to hold the same in engagement.

6. A vehicle spring comprising a plurality of leaves having inwardly directed overlapping ends forming fulcrums on opposite sides of the part of support for a higher leaf, and a spiral spring acting at a right angle therewith.

7. A vehicle spring comprising a plurality of leaf springs integrally connected at one end, the other ends tapered and each affording a support for the next higher leaf on opposite sides of the center, a hound secured at the top of said springs, and acting to move with the axle and a segment above the spring affording a fifth wheel.

8. A vehicle spring comprising a plurality of leaves rigidly engaged together centrally and having upwardly and inwardly directed ends, each adapted to form a support for the next higher opposite end and means thereon adapted to hold said ends in register.

In testimony whereof I have hereunto subscribed my name in the presence of two subscribing witnesses.

ELMER LEWIS BRILLHART.

Witnesses:
CHARLES W. HILLS,
K. E. HANNAH.